United States Patent [19]

Ninomiya

[11] Patent Number: 5,523,670
[45] Date of Patent: Jun. 4, 1996

[54] METHOD AND APPARATUS FOR CONTROLLING POWER SUPPLY

[75] Inventor: Ryozi Ninomiya, Tokyo, Japan

[73] Assignee: Kabushiki Kaisha Toshiba, Kawasaki, Japan

[21] Appl. No.: 207,809

[22] Filed: Mar. 9, 1994

Related U.S. Application Data

[63] Continuation of Ser. No. 784,890, Oct. 30, 1991, abandoned.

[30] Foreign Application Priority Data

Nov. 7, 1990 [JP] Japan .................................. 2-301689

[51] Int. Cl.$^6$ ........................................................ H02J 7/04
[52] U.S. Cl. ......................... 320/14; 320/20; 320/38; 320/40
[58] Field of Search .................................. 320/20, 21, 23, 320/24, 31, 32, 39, 40, 14

[56] References Cited

U.S. PATENT DOCUMENTS

| | | | |
|---|---|---|---|
| 4,052,717 | 10/1977 | Arnold et al. | 340/249 |
| 4,392,101 | 7/1983 | Saar et al. | 320/20 |
| 4,418,310 | 11/1983 | Bollinger | 320/39 |
| 4,549,127 | 10/1985 | Taylor et al. | 320/21 |
| 4,639,655 | 1/1987 | Westhaver et al. | 320/14 |
| 4,716,354 | 12/1987 | Hacker | 320/39 |
| 4,730,121 | 3/1988 | Lee et al. | 307/66 |
| 4,746,852 | 5/1988 | Martin | 320/20 |
| 4,754,160 | 6/1988 | Ely | 307/66 X |

FOREIGN PATENT DOCUMENTS

| | | |
|---|---|---|
| 0005841 | 12/1979 | European Pat. Off. . |
| 0368353 | 5/1990 | European Pat. Off. . |
| 0404588 | 12/1990 | European Pat. Off. . |

*Primary Examiner*—Steven L. Stephan
*Assistant Examiner*—Nicholas Ponomarenko
*Attorney, Agent, or Firm*—Oblon, Spivak, McClelland, Maier & Neustadt

[57] ABSTRACT

When an AC adapter and a battery are connected to a system, the rapid charge for the battery is started. During the rapid charge, the battery voltage of the battery is detected by a voltage detector. A power supply controller samples the detected battery voltage at predetermined sampling times, thereby to monitor changes in the battery voltage. If the battery voltage rapidly changes at least twice within a predetermined period of time, it is determined that the battery is in a full charge state, and the rapid charge for the battery is stopped.

12 Claims, 5 Drawing Sheets

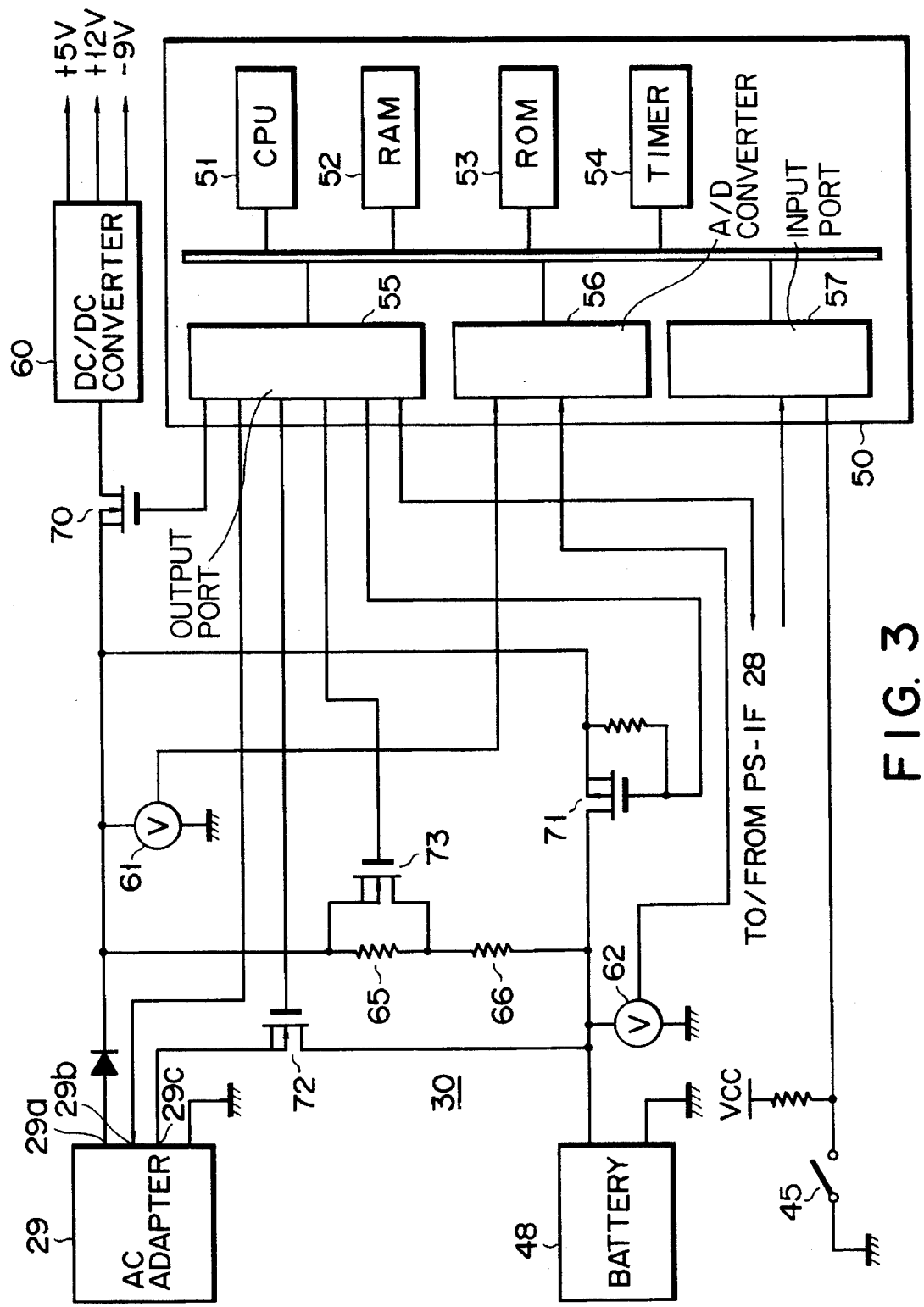
F I G. 3

METHOD AND APPARATUS FOR CONTROLLING POWER SUPPLY

This application is a continuation of application Ser. No. 07/784,890, filed on Oct. 30, 1991, now abandoned.

BACKGROUND OF THE INVENTION

1. Field of the Invention

The present invention relates to a method and apparatus for controlling a power supply.

2. Description of the Related Art

In general, many electronic apparatus, such as lap-top personal computers or word processors, are operated by an AC adapter and/or an incorporated chargeable battery. The battery is charged, with a current, i.e., a charge current, supplied from the AC adapter.

In the electronic apparatus of this type, the battery is generally charged with a constant current. When the battery is charged with a constant current, the battery voltage of the battery gradually increases from the start of charging. When the battery voltage approaches to the voltage corresponding to the full charge state, the battery voltage rapidly increases and when the battery voltage reaches a voltage corresponding to the full charge state, the battery voltage decreases. This is due to the characteristics of the battery, and in general used secondary batteries have such characteristics.

In a conventional electronic apparatus, the full charge state of a battery is detected on the basis of a voltage decrease occurring after the battery voltage becomes equal to the voltage corresponding to the full charge state. In other words, the conventional electronic apparatus determines that the battery is in the full charge state when the battery voltage becomes maximum. Therefore, the battery is to be overcharged.

If an overcharge occurs while the battery is charged with a large amount of current, i.e., rapid charge is being executed, the performance of the battery is affected.

A conventionally used nickel-cadmium battery is not much affected by overcharge in the performance of the battery. However, a nickel-hydrogen battery which is expected to be a main secondary battery is adversely affected by overcharge in the performance of the battery. Therefore, in the case where the battery such as the nickel-hydrogen battery is incorporated in a conventional electronic apparatus for detecting a full charge state of the battery by utilization of a decrease in the battery voltage, since overcharge is executed, the performance of the battery is adversely affected.

Under the circumstances mentioned above, there is a demand for a power source control apparatus which allows detection of the full charge state of a battery, without overcharge occurring.

SUMMARY OF THE INVENTION

The object of the present invention is to provide a method and apparatus for controlling power supply.

According to one aspect of the present invention, there is provided a power supply controlling apparatus comprising: a battery being chargeable, supply means for supplying a charge current to the battery, and control means for sampling a battery voltage of the battery at predetermined sampling times while the battery is charged, determining in accordance with the sampled battery voltage whether or not the battery is in a full charge state, and for causing the supply means to stop the supply of the charge current to the battery when the battery is in the full charge state.

According to another aspect of the present invention, there is provided a power supply controlling method comprising the steps of determining whether or not a battery is set in the electric apparatus and whether or not an adapter for supplying a charge current to the battery is connected, the battery being chargeable, causing the battery to be charged when the battery is set and the adapter is connected, sampling a battery voltage of the battery at predetermined sampling times when the battery is being charged, determining in accordance with the sampled battery voltage whether or not the battery is in a full charge state, and stopping the supply of the charge current to the battery when the battery is in the full charge state.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 3 is a block circuit diagram showing a power source circuit used in the embodiment of the present invention.

DETAILED DESCRIPTION OF THE PREFERRED EMBODIMENTS

A preferred embodiment of the present invention will now be described referring to the accompanying drawings.

Figure 1:
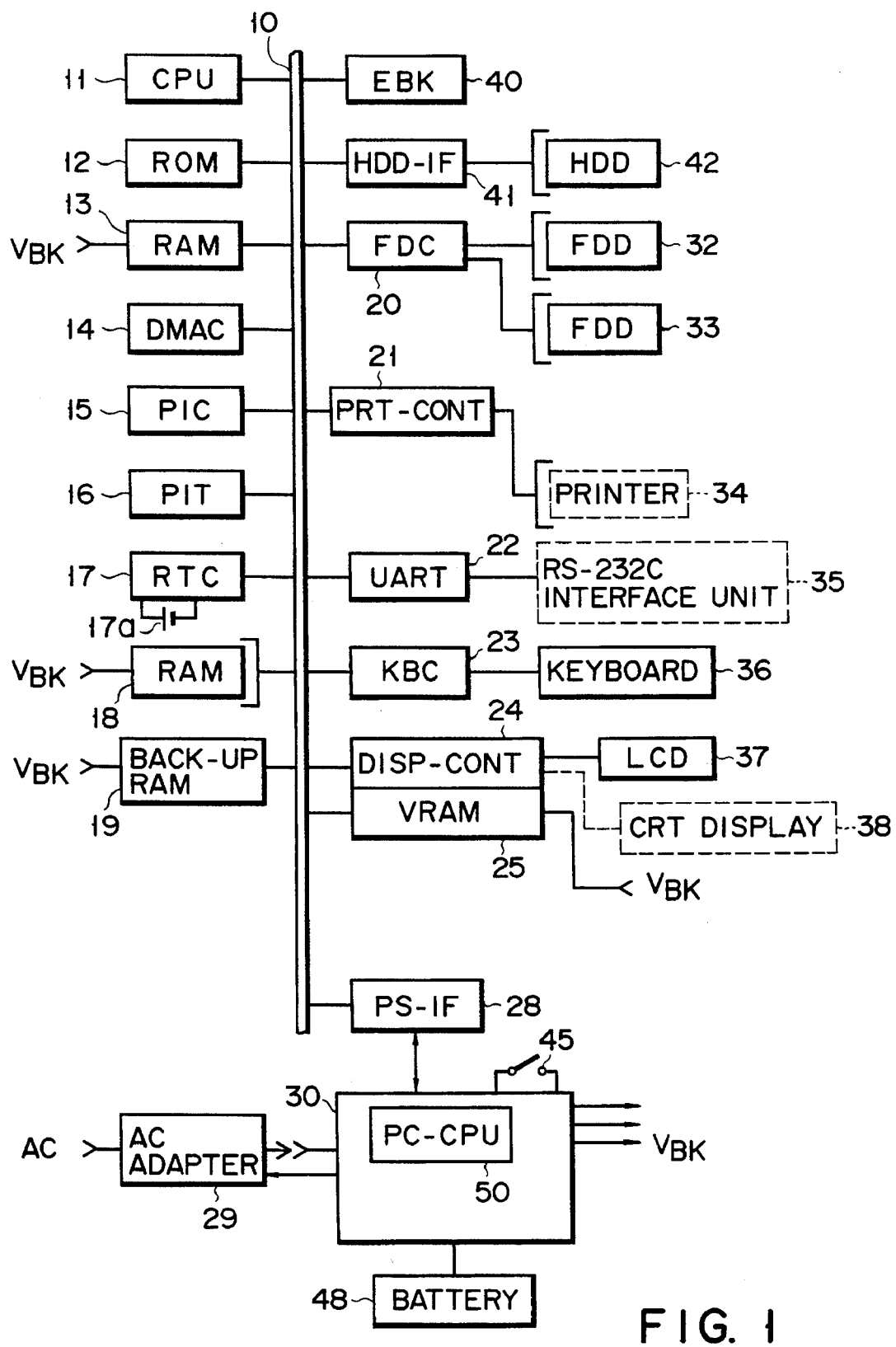
FIG. 1 is a block circuit diagram showing a computer system used in an embodiment of the present invention.

FIG. 1 shows a block diagram illustrating the configuration of a computer system used in one embodiment of the present invention. As shown in FIG. 1, this computer system comprises a system bus 10, a main CPU (Central Processing Unit) 11 for controlling the entire system, a ROM (Read Only Memory) 12 for storing a control program inherent to the system, etc., a RAM (Random Access Memory) 13, a direct memory access controller (DMAC) 14 for performing the direct memory access control, a programmable interrupt controller (PIC) 15 settable by a program, a programmable interval timer (PIT) 16 settable by a program, a real time clock (RTC) 17 as a timer module with a drive battery 17a, an expansion RAM 18 with a large capacity and connectable to a special card slot, and a backup RAM 19 for storing backup data, etc. to implement a resume function.

The computer system also includes a floppy disk controller (FDC) 20. Floppy disk drives (FDDs) 32 and 33 are connected to the floppy disk controller 20 which controls these disk drives.

Further, the computer system comprises a printer controller (PRT-CONT) 21, a universal asynchronous receiver/transmitter (UART) 22 as an input/output interface, a keyboard controller (KBC) 23, a display controller (DISP-CONT) 24, a video RAM (VRAM) 25, a power supply interface (PS-IF) 28, an AC adaptor 29, a power supply circuit 30 having a power controller (PC-CPU) 50, a keyboard 36, an LCD (Liquid Crystal Display) 37, an expansion bus connector (EBC) 40, a hard disk drive interface (HDD-IF) 41, a hard disk drive (HDD) 42, a power supply switch 45, and a battery 48.

A printer 34 or the like is selectively connected to the printer controller 21. An RS-232C interface unit 35 is connected to the universal asynchronous receiver/transmitter 22 as needed. The keyboard controller 23 controls a key input through the keyboard 36.

The display controller 24 controls the LCD 37 which is attached swingable to the computer body, or a CRT (Cathode Ray Tube) display 38 which is selectively connected to the computer.

The power supply interface 28 receives and transfers serial data from and to the power supply controller 50 in the power supply circuit 30.

The AC adapter 29, connectable to the computer system, is connected to an external power supply (not shown), and rectifies/smooths an AC voltage from the external power supply to output a DC voltage. If the AC adapter 29 is connected to the computer system to activate the system, the voltage is supplied from the AC adapter 29 through the power supply circuit 30 to each component of the computer system.

A backup voltage VBK is supplied to each of the RAMs 13 and 18, the backup RAM 19 and the VRAM 25.

The expansion bus connector 40 is used for functional expansion of the system. For example, an external hard disk drive is selectively connected to the expansion bus connector 40. An expansion unit (not shown) having various components, such as a keyboard, a CRT display, a memory, a connector to the body of the computer system, can also be selectively connected to the expansion bus connector 40.

The power supply switch 45 is used to activate this computer system, and has a momentary switch. When the DC voltage is not yet supplied to the individual components from the power supply circuit 30, or when the power supply is off, depression of the power supply switch 45 activates the power supply. When the DC voltage is supplied to the individual components from the power supply circuit 30 and the system is operated, or when the power supply is on, depression of the power supply switch 45 deactivates the power supply.

The battery 48 can be recharged or rapidly charged and built in the computer system. If the AC adapter 29 is not connected to the computer system and the battery 48 is built therein instead, a DC voltage is supplied from the battery 48 through the power supply circuit 30 to the individual components of the computer system in order to activate the computer system. A nickel-hydrogen battery is used as the battery 48, for example.

Figure 2:
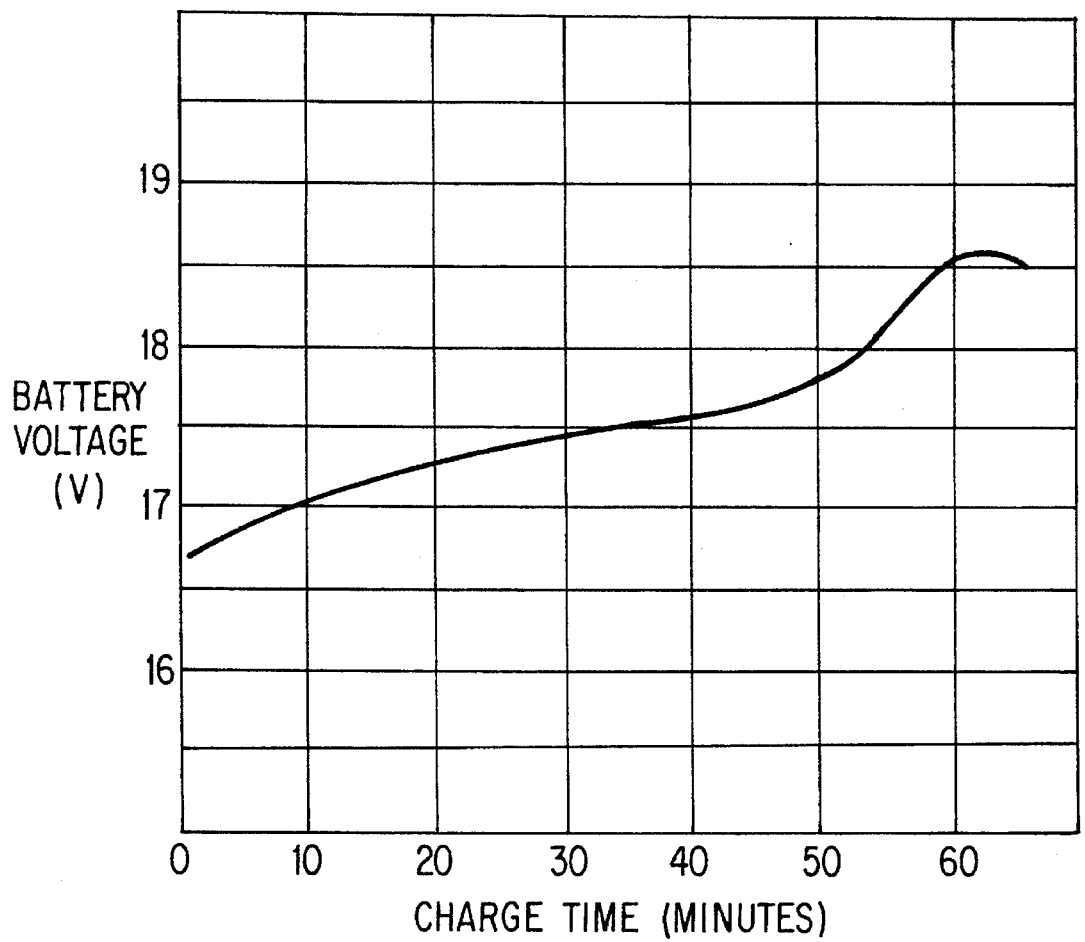
FIG. 2 is a graph showing the charging characteristic in a battery being charged rapidly.

FIG. 2 is a graph showing the charging characteristic in the battery 48 being charged rapidly. In FIG. 2, the axis of ordinates represents the battery voltage of the battery 48, the axis of abscissas represents the charge time of the battery 48. The battery 48 has such a charging characteristic as shown in FIG. 2. That is, the battery voltage per unit charge time greatly increases near the full charge state (battery voltage: approximately 18.5 V, charge time: approximately 60 minutes).

The power supply circuit 30 will now be described. FIG. 3 is a structural block diagram illustrating the power supply circuit according to the embodiment of the prevent invention. The power supply circuit 30 includes the power supply controller 50, a DC/DC converter 60, voltage detectors 61 and 62, resistors 65 and 66, and FET switches 70, 71, 72 and 73.

The AC adapter 29 has a constant-voltage output terminal 29a, a control-signal input terminal 29b, and a constant-current output terminal 29c. A constant voltage of 18 V is output from the constant-voltage output terminal 29a. A constant current of 2.2 A is output from the constant-current output terminal 29c. A control signal from the power supply controller 50 is supplied to the control signal input terminal 29b. In response to the control signal, the AC adapter 29 outputs either the constant voltage or constant current.

The DC/DC converter 60 generates a DC voltage of a predetermined level based on the DC voltage supplied from either the AC adapter 29 or the battery 48, and supplies the generated DC voltage of the predetermined level to the individual components of the computer system. Since the DC voltage from the AC adapter 29 or the battery 48 is 18 V, DC voltages of +5 V, +12 V and −9 V are actually supplied to predetermined components.

The voltage detector 61 detects an adapter voltage of the AC adapter 29, i.e., the constant voltage output from the constant-voltage output terminal 29a. The voltage detector 62 detects the battery voltage of the battery 48. Based on these detected voltages, it is determined whether the AC adapter 29 or the battery 48 is connected to the computer system.

The FET switch 70 is used to supply or stop supplying the DC voltage to the DC/DC converter 60 from the AC adapter 29 or the battery 48. When the FET switch 70 is on, the DC voltage is supplied to the DC/DC converter 60. Therefore, the DC/DC converter 60 can supply the above-described voltage of the predetermined level to each component.

The FET switch 71 is used to supply the DC voltage from the battery 48 through the FET switch 70 to the DC/DC converter 60. When the FET switch 71 is turned on, the DC voltage can be supplied to the DC/DC converter 60 from the battery 48.

The FET switch 72 is utilized to supply the constant current from the constant-current output terminal 29c of the AC adapter 29 to the battery 48. When the FET switch 72 is on, the constant current is supplied to the battery 48 for rapid charge.

The FET switch 73 is used to supply the constant voltage from the constant-voltage output terminal 29a of the Ac adapter 29 to the battery 48. When the FET switch 73 is on, the constant voltage is supplied to the battery 48 through the resistor 66 for trickle charge.

The trickle charge represents that a rechargeable battery, even after fully charged by an AC adapter, continues to be charged all the time with a current smaller than a charge current.

The resistor 65 is a current limiting resistor, used to inhibit supplying of a large current to the battery 48, has usually a high resistance.

The resistor 66, used for trickle charge, and has a low resistance, for example, several tens $\Omega$(ohm).

The power supply controller 50 has a CPU 51, a RAM 52, a ROM 53, a timer 54, an output port 55, an A/D converter 56 and an input port 57.

The CPU 51, constituted by one chip, controls a voltage supply to the individual component, and rapid charge/trickle charge to the battery 48.

The ROM 53 stores control programs, etc. to be used for the voltage supply control and the rapid charge/trickle charge control. In the embodiment, the rapid charge is performed.

The RAM 52 is used as the main memory of the CPU 51. Assigned to the RAM 52 are various memory areas, as a flag, a counter and the like, used to the voltage supply control and the rapid charge/trickle charge control. In this embodiment, part of RAM 52 is used as first and second counters, a rapid charge flag and a full charge flag, as described later.

The timer 54 outputs a timer value to the CPU 51 by a predetermined cycle.

The output port 55 outputs a control signal individually to the control-signal input terminal 29b of the AC adapter 29, and the FET switches 70, 71, 72 and 73, and transmits data to the power supply interface 28. In response to the control signal at the control-signal input terminal 29b, the AC adapter 29 outputs the constant current or the constant voltage. The FET switches 70, 71, 72 and 73 are turned on or off depending on the received control signals at each FET switch. To control the charging of the battery 48, a control signal used to turn on/off the FET switch 72 is output from the output port 55.

The A/D converter 56 converts analog voltages output respectively from the voltage detectors 61 and 62 into digital voltages.

The input port 57 receives a signal indicating whether the power supply switch 45 is depressed. As shown in FIG. 3, the level of a voltage to the input port 57 is Vcc as long as the power supply switch 45 is not depressed. Since the power supply switch 45 is a momentary switch as described above, however, the level of the received voltage at the input port 57 is "0" during a predetermined period of time upon each depression of the power supply switch 45. By detecting a change in voltage level, therefore, it can be determined whether the power supply switch 45 is depressed.

Figure 4A:
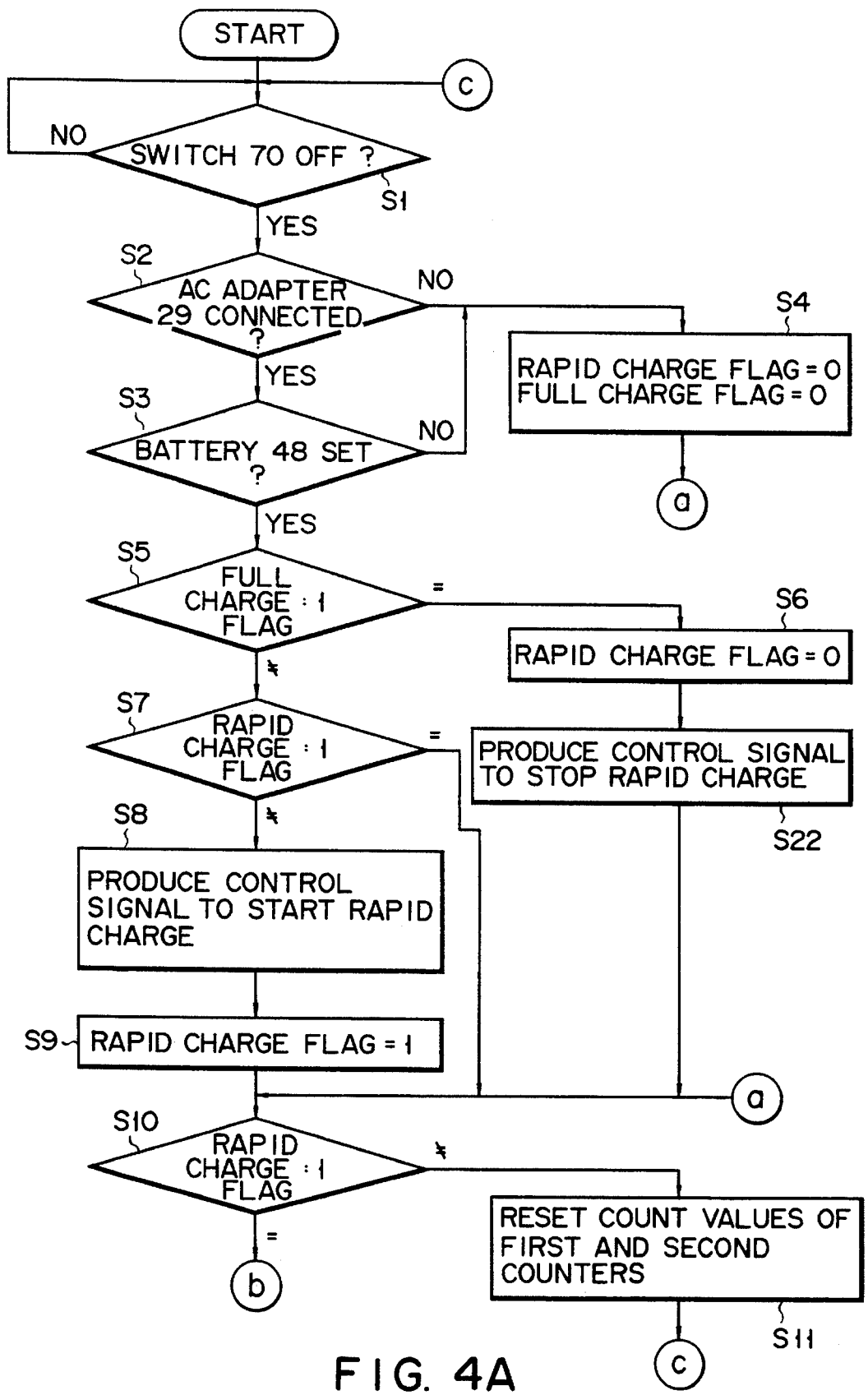
FIGS. 4A and 4B are flowcharts of battery charge control in the CPU of the power source controller.
Figure 4B:
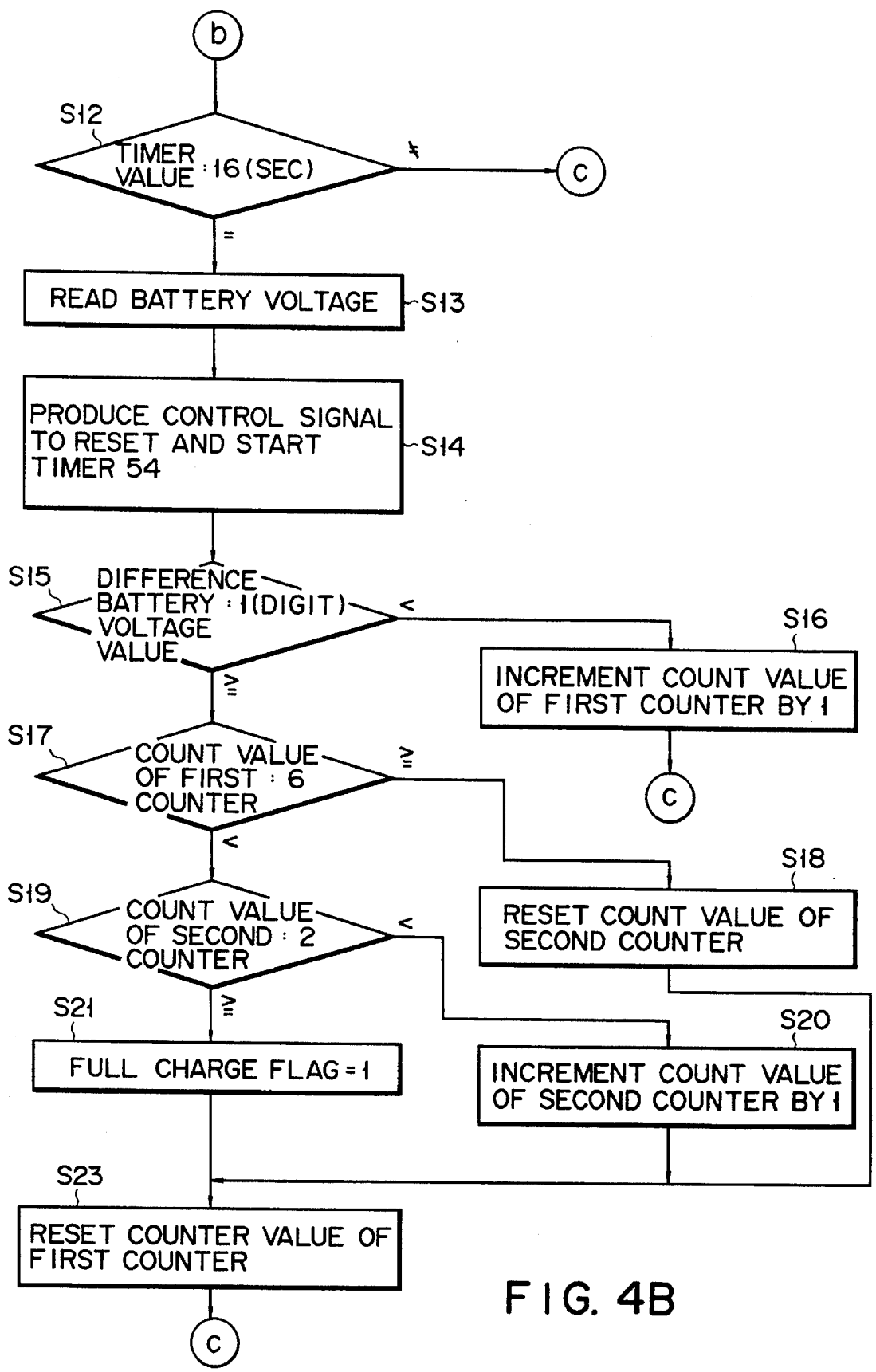

With reference to the flowcharts shown in FIGS. 4A and 4B, charge control of the battery 48 in the CPU 51 of the power supply controller 50 will be described.

CPU 51 of the power supply controller 50 executes the battery charge control program stored in ROM 53. In the present embodiment, a rapid charge control is executed.

In the rapid charge control, contents of memory areas of RAM 52 assigned as a flag are referred to. A full charge flag indicates whether or not the battery 48 is in the full charge state. It is set to be "0" in cases where the AC adapter 29 is not connected to the computer system or the battery 48 is not incorporated therein. It is set to be "1" when the battery 48 is fully charged during the rapid charge. When the full charge flag is set to be "1", the FET switch 72 is turned off, and the rapid charge of the battery 48 by the AC adapter 29 is inhibited.

A rapid charge flag indicates whether or not the rapid charge of the battery 48 is being executed. It is set to be "0" in cases where the AC adapter 29 is not connected to the computer system, the battery 48 is not incorporated therein, or the battery 48 is fully charged during execution of the rapid charge. It is set to be "1" when the rapid charge is to be started. It should be noted that both the full charge flag and the rapid charge flag are "0" before start of the rapid charge control.

Memory areas of RAM 52 assigned as the first and second counters are also referred to. The count value of the first counter indicates that the battery voltage of the battery 48 gradually changes during the rapid charge (at normal times, the battery voltage gradually increases). While the battery voltage is gradually changed, the count value of the first counter increases. The count value of the second counter indicates that the battery voltage rapidly changes during the rapid charge (at normal times, the battery voltage rapidly increases). While the battery voltage is rapidly changed, the count value of the second counter increases.

In step S1, it is determined whether or not the FET switch 70 is off, i.e., whether or not a voltage from either the AD adapter 29 or the battery 48 is supplied to each component of the computer system. If the FET switch 70 is off in step S1, it is determined in step S2 whether or not the AC adapter 29 is connected to the computer system. Further, in step S3, it is determined whether or not the battery 48 is incorporated in the computer system. Steps S2 and S3 are executed because there is a possibility that the AC adapter 29 or the battery 48 will be disconnected or removed from the computer system during the rapid charge.

If the AC adapter 29 is not connected to the computer system in step S2 or if the battery 48 is not incorporated in the computer system in step S3, both the rapid charge flag and the full charge flag are set to be "0" (step S4).

In steps S2 and S3, when the AC adapter 29 is connected to the computer system and the battery 48 is incorporated therein, the physical conditions for performing the rapid charge are considered to be satisfied. Therefore, in step S5, it is determined whether or not the full charge flag is "1."

If the full charge flag is "1" in step S5, that is, if the full charge state occurs in the battery 48 during the rapid charge, the rapid charge flag is set to be "0" (step S6), and a control signal for turning off the FET switch 72 is produced so as to stop the rapid charge. The control signal is output from the output port 55 and is supplied to the FET switch 72. The control signal causes the AC adapter 29 to stop the supply of the charge current to the battery 48, so that the rapid charge stops.

If the full charge flag is not "1" but "0" in step S5, the battery 48 is not in the full charge state. Therefore, in step S7, it is determined whether or not the rapid charge flag is set to be "1."

If the rapid charge flag is not "1" but "0" in step S7, it is determined that the battery 48 is rapid-rechargeable under physical conditions but has not yet been actually rapid-charged. Thus, control signals are produced to start the rapid charge of the battery 48. One control signal used to supply a charge current from the constant current output terminal 29c of the AC adapter 29 is output from the output port 55 to the control signal input terminal 29b of the AD adapter 29. The other control signal used to turn on the FET switch 72 is output from the output port 55 to the FET switch 72. As a result, a charge current is supplied from the AC adapter to the battery 48, thus starting the rapid charge.

If the rapid charge flag is "1" in step S7, it is determined that the battery 48 is being charged. Therefore, processing of step S10 is executed without performing steps S8 and S9. Processing of step S10 is also executed after steps S4 and S22. Step S10 and following steps are executed to detect the full charge state in the battery 48 during the rapid charge.

In step S10, it is determined whether or not the rapid charge flag is "1," i.e., whether or not the battery 48 is being rapidly charged. If the rapid charge flag is not "1" but "0" in step S10, the count values of the first and second counters are reset in step S11, and the processing flow returns to step S1.

If the rapid charge flag is "1" in step S10, since it is determined that the battery 48 is being rapidly charged, the battery voltage of the battery 48 is sampled at a predetermined sampling time (e.g., at an interval of 16 seconds). That is, in step S12, it is determined whether the timer value of timer 54 reaches the value corresponding to 16 seconds.

If the timer value of timer 54 reaches the value corresponding to 16 seconds in step S12, a value representing the battery voltage output from the voltage detector 62 to the A/D converter 56 is read out (step S13). The read out battery voltage is stored in RAM 52, so as to execute the processing of step S15 to be mentioned later. In step S14, a control signal used to reset and start the timer 54 is produced. Thus, the battery voltage of the battery 48 is monitored at intervals of 16 seconds.

If the timer value of timer 54 does not reach the value corresponding to 16 seconds in step S12, then it is determined that the present time is not a time for sampling the battery voltage, and the processing flow returns to step S1.

In step S15, a difference battery voltage value representing the difference between the two successive battery voltage values read out at intervals of 16 seconds, or gradients is compared with a voltage value corresponding to one digit. The voltage value corresponding to one digit is about 96 mV.

If the difference battery voltage value is smaller than the voltage value corresponding to one digit in step S15, it is determined that the battery voltage is gradually changing within a unit time (the sampling time of 16 seconds). Therefore, the count value of the first counter is increased by 1 in step S16, and the processing flow returns to step S1.

In step S15, if the difference battery voltage value is equal to or larger than the voltage value corresponding to one digit, it is determined that the battery voltage is rapidly changed during the unit time. In step S17, it is determined whether or not the count value of the first counter is smaller than 6, i.e., whether or not the battery voltage rapidly is changed in a predetermined period of time. For example, the predetermined period of time is 80 seconds (sampling time×[count value−1]=16 seconds×[6−1]). That is, it is determined whether or not the battery voltage is rapidly changed again within the predetermined period of time after the battery voltage is rapidly changed.

In step S15, if the count value of the first counter is equal to or larger than 6, it is determined that the battery voltage dose not rapidly change within the predetermined period of time, and the count value of the second counter is reset (step S18). In the present embodiment, to prevent an erroneous operation, it is not determined that the battery 48 is in the full charge state as long as the battery voltage rapidly changes only once.

In step S17, if the count value of the first counter is smaller than 6, it is determined that the battery voltage is rapidly changed within the predetermined period of time. In step S19, it is determined whether or not the count value of the second counter is equal to or larger than 2, i.e., whether or not the battery voltage is rapidly changed twice within the predetermined period of time.

In step S19, if the count value of the second counter is smaller than 2, it is determined that the battery voltage is rapidly changed for the first time within the predetermined period of time, and the count value of the second counter is increased by 1 in step S20.

On the other hand, in step S19, if the count value of the second counter is equal to or larger than 2, it is determined that the battery 48 is in the full charge state. In this case, the full charge flag is set to be "1" in step S21. As a result, the rapid charge of the battery 48 is stopped, due to the above-mentioned processing of step S22.

After execution of step S18, S20 or S21, in step S23, the count value of the first counter is reset. Thereafter, the processing flow returns to step S1.

As mentioned above, according to the present invention, the rapid charge of the battery is controlled in accordance with battery voltage changes occurring within a predetermined period of time. Since, therefore, the fully charge state of the battery can be detected at an early time, the battery is prevented from being overcharged. Therefore, it is possible to maintain the performance of the battery.

The battery to be rapidly charged in the present invention is not limited to the battery having the charge characteristic as shown in FIG. 2. The present invention is applicable to any type of battery having a charge characteristic that the battery voltage per unit time rapidly changes near the full charge state of the battery.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A power supply control apparatus for a portable computer, comprising:

a rechargeable battery;

supply means for supplying a charge current to the rechargeable battery;

means for sampling a battery voltage of the rechargeable battery at predetermined sampling times during which the battery is charged;

means for obtaining a gradient of the sampled battery voltage;

means for comparing the obtained gradient with a reference value;

a counter for counting the sampling when a result of the comparing means indicates that the gradient is larger than the reference voltage;

means for determining that the battery is in a full charge state if a value of the counter is two or more within specified sampling times; and means for causing the supply means to stop the supply of the charge current to the battery when the determining means determines that the battery is in the full charge state.

2. The apparatus according to claim 1, further comprising means for obtaining a difference between a first time required for the battery voltage to reach a first voltage and a second time required for the battery voltage to reach a second voltage;

second determining means for determining that the difference obtained by the obtaining means is a predetermined value or less; and wherein the means for determining determines that the battery is in a full charge state if the second determining means determines that the difference is a predetermined value or less.

3. The apparatus according to claim 1, further comprising means for obtaining a difference between battery voltages at first and second sampling points;

second determining means for determining that the difference obtained by the obtaining means is a predetermined value or more; and wherein the determining means determines that the battery is in a full charge state if the second determining means determines that the difference is a predetermined value or more.

4. A method for controlling a power supply having a rechargeable battery, comprising the steps of:

a) supplying a charge current to the rechargeable battery;

b) sampling a battery voltage of the rechargeable battery at predetermined sampling times during which the battery is charged;

c) obtaining a gradient of the sampled battery voltages;

d) comparing the obtained gradient with a reference value;

e) determining that the battery is in a full charge state if a comparison result from the comparing step represents, in a plurality of times within a predetermined period of time, that the gradient is larger than the reference value; and f) causing the power supply to stop the supply of the charge current to the battery when the determining step determines that the battery is in the full charge state.

5. The method according to claim 12, further comprising the steps of:

g) obtaining a difference between a first time required for the battery voltage to reach a first voltage and a second time required for the battery voltage to reach a second voltage;

h) determining that the difference obtained in step g) is a predetermined value or less;

and wherein the determining step in a step e) determines that the battery is in a full charge state if the determination in step h) is a predetermined value or less.

6. The method according to claim 4, further comprising the steps of:

g) obtaining a difference between battery voltages at first and second sampling points;

h) determining that the difference obtained in step g) is a predetermined value or less;

and wherein the determining step in step e) determines that the battery is in a full charge state if the determination in step h) is a predetermined value or more.

7. A power supply control apparatus for a portable computer, comprising:

a rechargeable battery;

supply means for supplying a charge current to the rechargeable battery;

means for sampling a battery voltage of the rechargeable battery at predetermined sampling times during which the battery is charged;

means for obtaining a gradient of the sampled battery voltage;

means for comparing the obtained gradient with a reference value;

a counter for counting a comparison result from the means for comparing if the result represents that the gradient is larger than the reference value; and means for determining that the battery is in a full charge state if a value from the counter is two or more within a predetermined period of time; and means for causing the supply means to stop the supply of the charge current to the battery when the determining means determines that the battery is in a full charge state.

8. The apparatus according to claim 7, wherein the determining means includes means for determining that the battery is in a full charge state if a difference between a first time required for the battery voltage to reach a first voltage and a second time required for the battery voltage to reach a second voltage is a predetermined value or less.

9. The apparatus according to claim 7, wherein the determining means includes means for determining that the battery is in a full charge state if a difference between battery voltages at first and second sampling points is a predetermined value or more.

10. A method for controlling a power supply having a rechargeable battery, comprising the steps of:

a) supplying a charge current to the rechargeable battery;

b) sampling a battery voltage of the rechargeable battery at predetermined sampling times during which the battery is charged;

c) obtaining a gradient of the sampled battery voltage;

d) comparing the obtained gradient with a reference value;

e) counting a comparison result from the comparing step if the result represents that the gradient is larger than the reference value;

f) determining that the battery is in a full charge state if a value from the counting step is a predetermined value or more within a predetermined period of time;

g) causing the power supply to stop the supply of the charge current to the battery when the determining step determines that the battery is in the full charge state.

11. The method according to claim 10, wherein the determining step includes determining that the battery is in a full charge state if a difference between a first time required for the battery voltage to reach a first voltage and a second time required for the battery voltage to reach a second voltage is a predetermined value or less.

12. The method according to claim 10, wherein the determining step includes determining that the battery is in a full charge state if a difference between battery voltages at first and second sampling points is a predetermined value or more.

* * * * *